Oct. 22, 1957 E. P. WIGNER ET AL 2,810,689
FLUID MODERATED REACTOR
Filed Nov. 6, 1945 5 Sheets-Sheet 1

Witnesses:
Herbert E. Metcalf
William J. Ruano

Inventors:
Eugene P. Wigner
Leo A. Ohlinger
Gale J. Young
Alvin M. Weinberg
By: Robert A. ———
Attorney Oct. 22, 1957  E. P. WIGNER ET AL  2,810,689
FLUID MODERATED REACTOR
Filed Nov. 6, 1945  5 Sheets-Sheet 2

Witnesses:
Herbert E. Metcalf
William J. Ruano

Inventors:
Eugene P. Wigner
Leo A. Ohlinger
Gale J. Young
Alvin M. Weinberg
By Robert A. Lavender
Attorney Oct. 22, 1957 E. P. WIGNER ET AL 2,810,689
FLUID MODERATED REACTOR
Filed Nov. 6, 1945 5 Sheets-Sheet 4

Inventors:
Eugene P. Wigner
Leo A. Ohlinger
Gale J. Young
Alvin M. Weinberg
By Robert R. [signature]
Attorney Oct. 22, 1957 E. P. WIGNER ET AL 2,810,689
FLUID MODERATED REACTOR
Filed Nov. 6, 1945 5 Sheets—Sheet 5

Witnesses:
Herbert E. Metcalf
William J. Ruano

Inventors:
Eugene P. Wigner
Leo A. Ohlinger
Gale J. Young
Alvin M. Weinberg
By Robert A. ...
Attorney.

United States Patent Office 2,810,689
Patented Oct. 22, 1957

2,810,689
FLUID MODERATED REACTOR

Eugene P. Wigner, Leo A. Ohlinger, Gale J. Young, and Alvin M. Weinberg, Chicago, Ill., assignors to the United States of America as represented by the United States Atomic Energy Commission Application November 6, 1945, Serial No. 627,070

1 Claim. (Cl. 204—193.2)

The present invention relates generally to neutronic reactors having liquid moderators, and more particularly to neutronic reactors having liquid moderators in which the reactor is cooled during operation by a circulated and cooled liquid moderator, and to means and methods of cooling such a reactor through circulation and cooling of the moderator.

In neutronic reactors, a neutron fissionable isotope, such as $U^{233}$, $U^{235}$, or $94^{239}$ or mixtures thereof, is subjected to fission by absorption of neutrons, and a self-sustaining chain reaction is established by the neutrons evolved by the fission. In general, such reactors comprise bodies of compositions containing such fissionable material, for example, natural uranium, disposed in a neutron slowing material which slow the neutrons to thermal energies. Such a slowing material is termed a neutron moderator. Carbon, beryllium, and $D_2O$ (heavy water) are typical moderators suitable for such use. Heat is evolved during the reaction which in reactors heretofore known is removed by passage of a coolant through the reactor in heat exchange relationship therewith. Specific details of the theory and the essential characteristics of such reactors are set forth in the copending application of Enrico Fermi and Leo Szilard, Serial No. 568,904, filed December 19, 1944, now U. S. Patent No. 2,708,656, dated May 17, 1955.

Hence, an object of the present invention is to provide a novel neutronic reactor of the liquid moderator type in which the moderator is circulated and cooled and employed as the cooling medium for the fissionable material.

Another object is to provide a novel cooled self-sustaining chain reacting system of the liquid moderator type having relatively high neutron densities and incorporating novel cooling means having a minimum of impurities so that the system is of relatively smaller size as compared with known systems of similar type.

Another object is to provide novel means for cooling a neutronic reactor of the liquid moderator type.

Another object is to provide a novel method of cooling a neutronic reactor of the liquid moderator type.

Other objects and advantages of the present invention are apparent from the following description taken in conjunction with the accompanying drawings, in which:

Fig. 1a is an enlarged top view of the control rod shown in Fig. 1;

Figure 1:
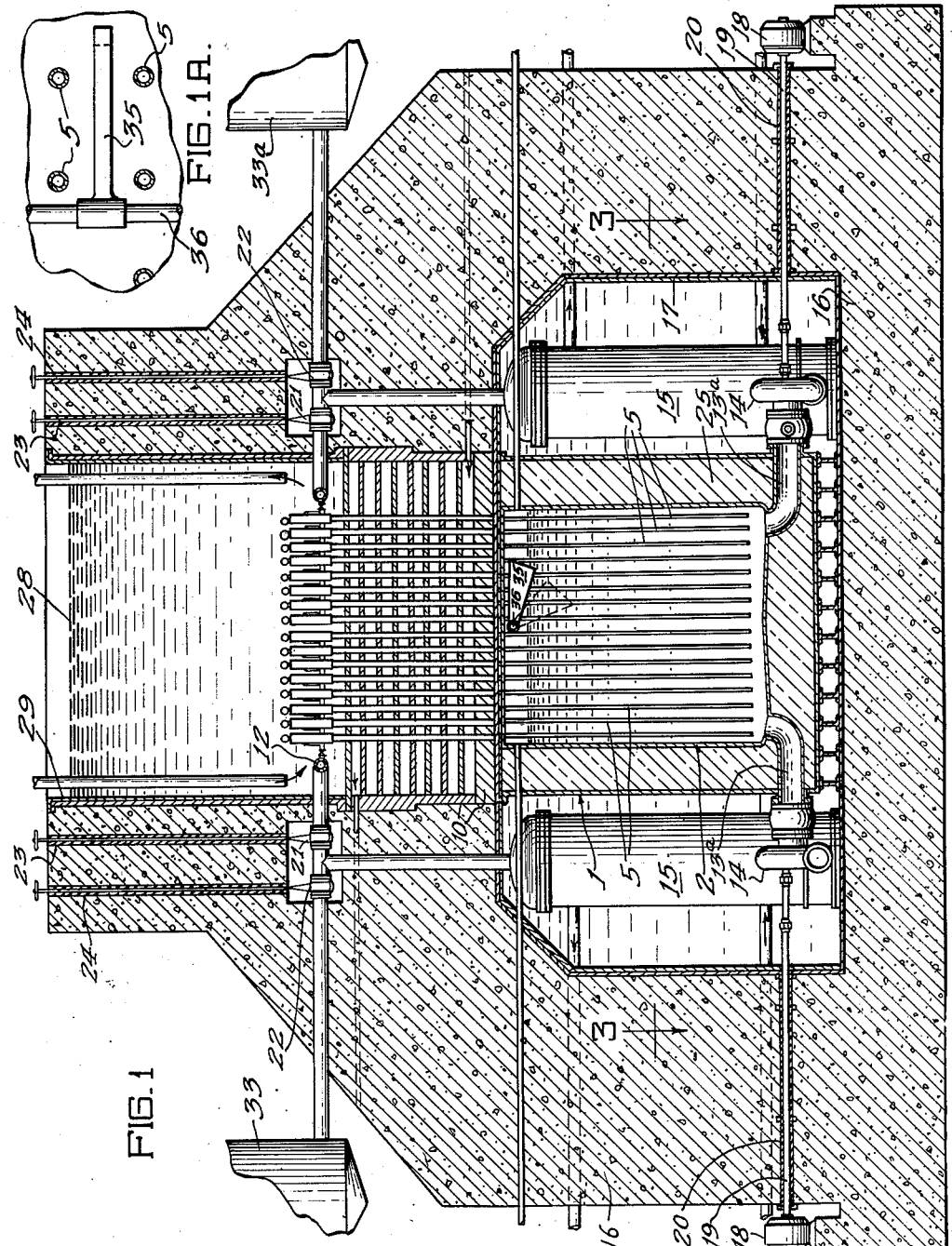
Fig. 1 is a diagrammatic vertical central sectional view, partly in elevation, of a self-sustaining neutron chain reacting system involving the present invention.
Figure 2:
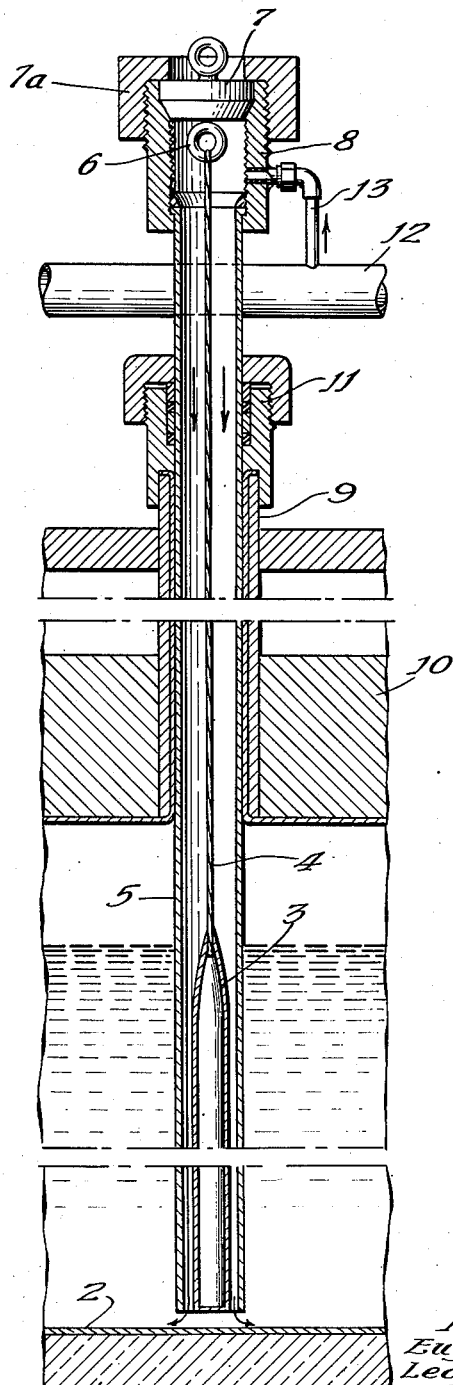
Fig. 2 is an enlarged sectional view of one of the uranium rods and surrounding tube shown in Fig. 1.

Referring more particularly to Figs. 1 and 2, numeral 1 denotes a reactor of a neutron chain reacting system having an active portion contained within a cylindrical tank 2 of aluminum, or other suitable non-corrodible material, relatively non-absorbing with respect to neutrons, said active portion comprising a plurality of rods 3 of fissionable material, such as uranium, uranium oxide, or other compounds of uranium, suspended in a neutron slowing fluid (i. e. moderator) contained in said tank, for example, deuterium (i. e. heavy hydrogen), or deuterium oxide ($D_2O$) commonly known as heavy water. Broadly, such a liquid moderator type reactor is well known now as is shown by the above mentioned Fermi et al. patent. Alternately, a deuterocarbon material operated at high temperature or heated by external heating means (if non-liquid at lower temperatures) may be used as a moderator, since it is essentially a hydrocarbon with its hydrogen in the form of deuterium, the deuterium content being useful in slowing neutrons. The tank 2 is substantially filled with the moderator and has sufficient heavy water so that the active portion of heavy water with the immersed uranium exceeds the critical size (that is, the size wherein the rate of lose of neutrons from the outside walls of the reactor equals the rate of gain of neutrons in the heavy water uranium active portion of the reactor of the neutron chain reaction system). Such critical size can be forecasted by taking measurements and plotting, for example, the reciprocals of neutron density at a certain point in the reactor tank as ordinates against some measure of the overall size of the uranium heavy water active portion (e. g. the level to which the heavy water has risen in the tank) as abscissas as the size is being increased by raising the level of heavy water in the tank. From these values, a curve will be obtained which when extrapolated will indicate in advance or forecast what the critical size will be before it is actually reached. This critical size will occur at the point where the curve crosses the axis of the abscissa. This method of determining critical size in advance was discovered prior to this invention.

Each of the uranium rods 3 is preferably sheathed in aluminum or other suitable non-corrodible material relatively non-absorbent to neutrons, closely fitting the rods to provide good heat transfer. These sheaths prevent passage of fission fragments from the uranium into the heavy water, to prevent the heavy water from becoming highly radioactive. Each rod 3 is suspended by a supporting cable 4 in a cylindrical tube 5 of a substantially non-corrodible material having low neutron absorbing characteristics such as, for example, aluminum, beryllium, or lead. The upper end of cable 4 is supported by an eye 6 extending through and having an upper counterpart above, a plug 7 sealed to a distributor head 8, by a screw threaded collar 7a, the head 8 being in turn sealed to the upper end of tube 5. By such construction, each rod 3 is readily replaceable by merely dropping a hook or other suitable tool from a crane or other lifting device (not shown) after unscrewing the collar 7a to engage the upper part of eye 6, so that the rod 3 can be lifted with the cable 4. Tube 5 extends through a sleeve 9 in a radiation shield 10 (which prevents undesired biological effects as explained below) and is sealed to the upper end of sleeve 9 by a gas-tight stuffing box 11 to prevent the escape of heavy water vapor and helium gas present in the tank as is hereinafter described.

The shield 10 comprises a series of spaced iron plates having cooling water flowing therebetween as indicated by arrows in Fig. 1. The effect of the shield 10 is to slow neutrons and to absorb gamma rays. More specifically, iron is more effective than most metals to slow fast neutrons by inelastic collisions. In such collisions, the neutron energy is used up in producing an excited state of the iron nucleus which later emits energy as gamma rays. Furthermore, iron is also an absorber for gamma rays and will therefore absorb gamma rays produced either by the inelastic collisions of fast neutrons with iron or by the absorption of slow neutrons by hydrogen or iron. Hydrogen, on the other hand, slows down fast neutrons to a velocity at which they are more readily absorbed by the iron and hydrogen nuclei. This absorption process sets free a gamma ray of several Mev energy for every neutron absorbed, these radiations in turn being absorbed by the iron. Combined, the iron and the water form an efficient shield against all radiations from the system.

Figure 3:
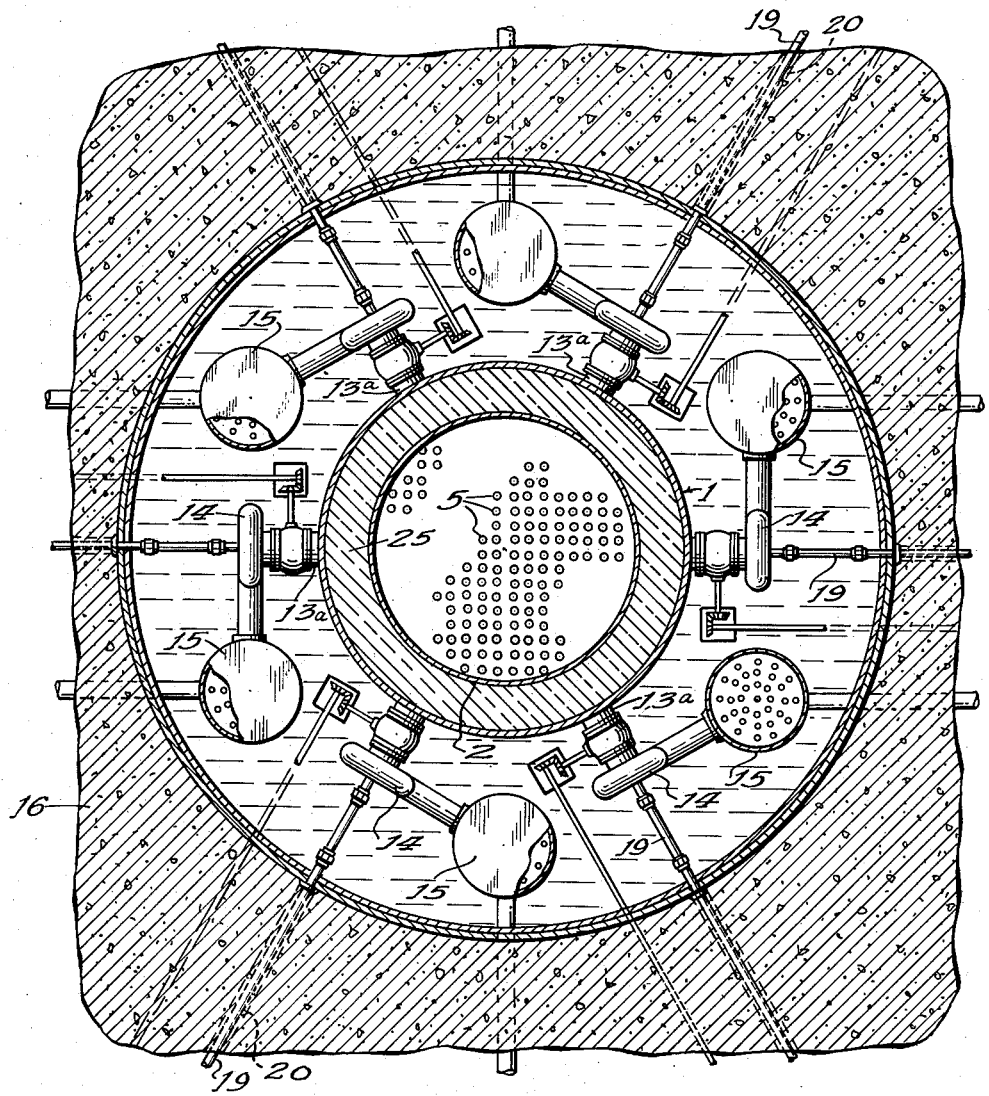
Fig. 3 is a sectional view taken along line 3—3 of Fig. 1, selected elements being shown in elevation for clarity.

A closed cooling system is provided to cool the uranium by use of the heavy water moderator. The use of the heavy water moderator or the like as the cooling medium for the uranium eliminates additional conduits (hence, impurities) necessary to pass another fluid in cooling relation through the reactor, particularly when tubes 5 are eliminated, and takes advantages of the low neutron absorption property of the heavy water, a double gain, thereby improving the reproduction constant K for a given reactor. Further, it is unnecessary to provide additional means for cooling the moderator itself. There is provided a header 12 having a plurality of pipes 13 for introducing the heavy water moderator coolant into the upper parts of tubes 5. This coolant then flows downwardly in each tube 5 as indicated by the arrows in Fig. 2, developing a high velocity within the narrow annular restriction closely surrounding the uranium rod 3, thereby effectively cooling each rod 3. The heavy water flows to the bottom of tank 2, coming out of the tubes at a high velocity, thereby swirling and stirring the entire moderator that otherwise would mix at relatively low velocity. The heavy water at the bottom of tank 2 flows through outlet ports 13a to a plurality of pumps 14 (see Fig. 3 showing, for example, six pumps) each of which pumps the heavy water to a corresponding heat exchanger or cooler, such as indicated by numeral 15, thence to header 12, thus forming a closed cooling system recirculating the moderator. In this manner, the entire body of the moderator is circulated and kept cool, thereby keeping the uranium rods 3 cool. The heat exchangers or coolers 15 are themselves cooled by any suitable means as indicated by the inlets and outlets (indicated by arrows), such as a continuous cool water supply coming from a well, stream or river, or spray tower. The reactor and cooling system are surrounded by a concrete shield 16 for reducing the escape of gamma and neutron radiations originating in the active portion of the reactor. A lead-lined steel tank 17 forms an enclosure for the heat exchangers 15.

A simplified cooling system contemplates continuous circulation of the moderator from the tank 2 through outlet ports 13a, then through heat exchangers 15, and returned directly to the tank 2 by suitable return conduits (not shown) similar to outlet ports 13. The sheathed rods 3 are disposed in the moderator in predetermined operative relationship normally substantially stationary, and are cooled directly by the mass of the moderator which is being continuously circulated as aforesaid at a rate to cool the rods 3. The level of the moderator is substantially unchanged during operation of the reactor insofar as circulation is concerned.

If desirable, a separate water cooling system (not shown) may be provided to cool the space between the heat exchangers 15 and lead-lined tank 17, this space acting as a radiation shield as well. Also, cooling coils may be placed between tank 17 and the concrete shield if desired. Generally speaking, the higher the atomic weight of an element the better it serves as a shield for penetrating radiations, such as gamma radiations. Lead of a particular thickness is, therefore, an excellent shield for certain purposes while water of the same thickness is only fair, for example. However, thick water shields are convenient and satisfactory.

Figure 7:
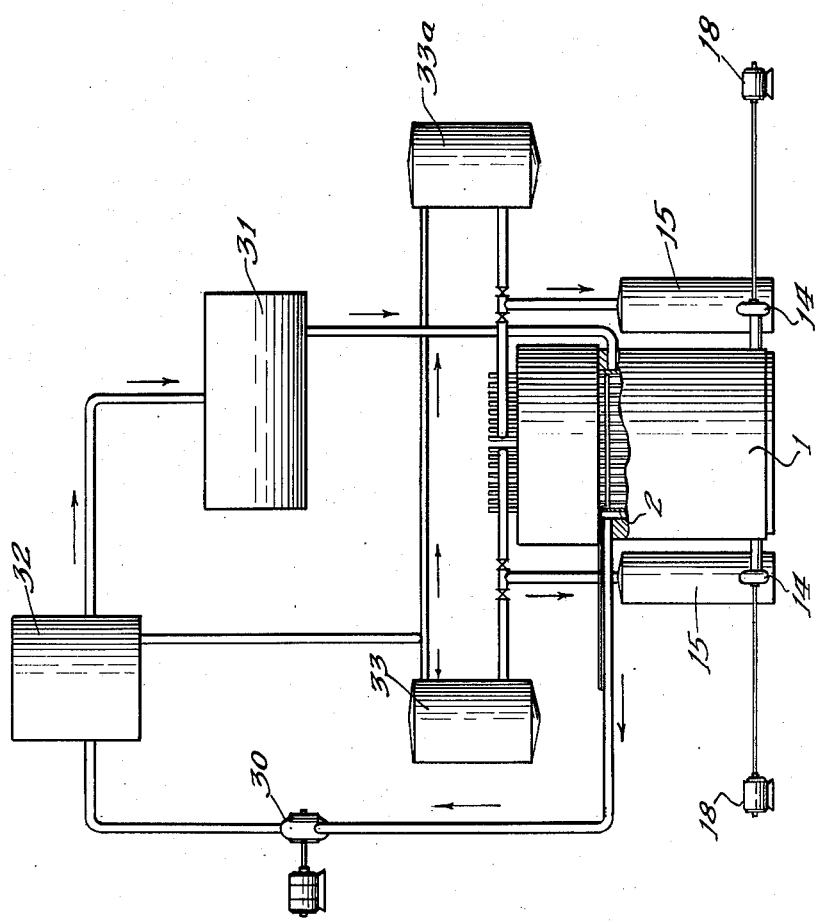
Fig. 7 shows the helium circulating system embodied in Fig. 1.

Each pump 14 is driven by a motor 18 located outside the concrete shield 16. The drive is through a jack shaft 19 extending through sleeve 20 which in turn extends through the concrete shield 16. Valves 21 and 22, for controlling the flow to the header 12 and heavy water storage tank 33, respectively, are likewise operable externally of the concrete shield 16 by valve handle extensions contained in sleeves 23 and 24, respectively. By closing valves 21 and opening valves 22 and operating pumps 14, the liquid moderator can be quickly emptied from tank 1 and transferred to the storage tanks 33 and 33a (see also Fig. 7). The level of the moderator is, therefore, readily controllable in this manner so that volumes over and under critical size are quickly obtainable.

The heavy water does not completely fill tank 2, there being a space above the heavy water level constituting a vapor and gas space. Since helium is a gas that is not affected to any great extent by neutrons, it is desirable that helium under pressure fill this space and such helium is preferably circulated therethrough. As the result of the high neutron density in the active portion of the reactor, particularly the central part, there is some decomposition of the heavy water into the deuterium and oxygen which rise in the form of gases into the space above the heavy water in tank 2. In order to carry off decomposition gases formed by such decomposition of heavy water noted above, the helium is circulated in tank 2 above the surface of the heavy water by pump 30 (see Fig. 7) which pumps the decomposition gases to a recombiner and condenser, for example, a hot grid or heated charcoal-platinum catalyst, and condenser, generally denoted in block form by numeral 32, thence to a helium storage tank denoted in block diagram form by numeral 31. Condensed $D_2O$ is tapped off the recombiner-condenser 32 and may be deposited in any convenient place, such as in the aforesaid heavy water storage tanks 33 and 33a. By suitably controlling pump 30 the pressure of the helium in the space at the top of tank 2 can be varied thereby varying the level of the heavy water in the tank. This is an effective way of controlling the neutron chain reaction since volumes above and below critical size are obtainable.

Immediately surrounding tank 2 is a graphite reflector 25 having substantially a cup shape. The reflector 25 reflects into the active portion of the reactor by scattering action some of the neutrons that might otherwise diffuse out of the system. The graphite is a good scattering material and has a low neutron absorption characteristic. Such elements as beryllium or bismuth may also be used. By using this peripheral layer of scattering or reflecting material the overall size of the active portion of the reactor can be made somewhat smaller than in a case where no scattering layer is employed, since neutron losses to the exterior are reduced.

The self-sustaining chain reaction in the present form may be controlled and intermittently stopped by insertion into the moderator of one or more neutron absorbing control elements, such as control rods 35 (see Fig. 1) preferably substantially wedge-shaped, and made of a material which efficiently absorbs neutrons, such as cadmium. Rods 35 are pivotally supported and may be moved into and out of the moderator between uranium rod rows (see Fig. 1a) by rotating shaft 36 extending through the concrete shield 16. Suitable automatic means responsive to neutron density (such as ionization chambers well-known in the art) preferably located near the periphery of the reactor may be used (not shown) to control these elements. These, however, form no part of the present invention. The control rods 35 may also be controlled manually, if so desired, or selectively manually and automatically, as disclosed in the copending application of Volney C. Wilson, Louis Slotin, Wilcox P. Overbeck and Darol K. Froman, Serial No. 588,302, filed April 14, 1945, entitled "Control System."

When it is desired to stop the self-sustaining neutron chain reaction the volume of the active portion in the reactor is decreased to below critical size. This may be accomplished by closing valve 21 and opening valve 22 and operating pumps 14 and its companion pumps so as to pump the heavy water into storage tanks 33 and 33a, thus lowering the heavy water level in tank 1 to below critical size, then closing valve 22 and reopening valve 21 to recirculate the remaining moderator through the reactor. After extended operation of the system it is necessary to continue such circulation of the moderator even after the chain reaction has ceased because of the large amount of heat developed by uranium rods 3 because of their continued radioactivity even after shutdown. In order to avoid tying up an appreciable volume of heavy water as a coolant during such period of inactivity, such volume otherwise being available from adjoining systems, and to avoid possible loss or contamination of heavy water (since heavy water is at present both scarce and expensive) the entire volume of heavy water in tank 2 may be pumped out by pumps 14 and replaced by a suitable replacement coolant such as water 28 stored in a lead-lined steel tank 29, by opening plugs 7. The water 28 forms a personnel shield, serving to absorb escaping rays and neutrons. While it is desirable to use light, or ordinary water as such replacement fluid, such substitution cannot be made directly due to its contaminating effect on heavy water in that ordinary water absorbs neutrons. However, by first replacing the heavy water by an immiscible liquid, such as oil or carbon tetrachloride, while simultaneously pumping the heavy water out of the reactor into any suitable container, possibly into storage tanks 33 and 33a, light water may then be introduced to replace such immiscible liquid and thereafter be circulated through the active portion of the reactor to keep the uranium rods relatively cool.

It may be desired to remove some or all of the uranium rods to extract element 94$^{239}$ and fission products both radioactive and stable therefrom. At this stage the uranium rods 3 may be removed (and replaced if desired) by unscrewing collar 7a of plug 7 and lifting eye 6 by a hook on a crane (not shown) or other suitable lifting device and placed into some well shielded receptacle (not shown) lowered into the water 28. The transfer from the reactor to the shielded receptacle is thus effected in the water 28, thereby shielding the operating personnel. Some of the water 28 may be enclosed in each receptacle to continue to cool the removed rod during transfer. It may be desirable to wait a few days after the chain reaction has been stopped before transferring the rod 3 to a transfer receptacle to allow some decay of the intense radioactivity. After about 30 days in some storage place the radioactivity is sufficiently low so that the rod 3 may be handled under normal, i. e. less stringent radiation precautions.

Figure 5:
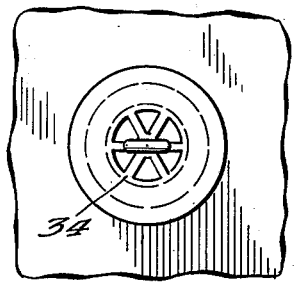
Fig. 5 is a top view of the plug shown in Fig. 4.
Figure 4:
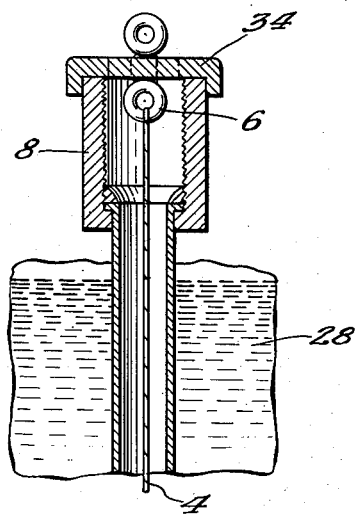
Fig. 4 shows a modification of the plug used at the top of the structure shown in Fig. 2.

As a modification of the above-described system, for permitting replacement of the uranium of the uranium rods 3, the liquid in reservoir 28 may be of heavy water. In this case, instead of using plugs such as 7, to seal the reactor tank from the reservoir, spiders such as 34, shown in Figs. 4 and 5 may be used, to allow intercommunication between reservoir 28 and tank 1, since both contain heavy water. The level of the heavy water in the reservoir 28 may be conveniently varied by a pump which discharges into a reservoir (not shown) in the direction indicated by arrows in a manner similar to pump 14 and reservoir 33. If it is not desired to add any heavy water to tank 1 when a rod is being replaced, the heavy water may be pumped out of reservoir 28 to below the level of spiders 34 or plugs 7 so that no heavy water will run through the spiders, or through the plugs 7 when they are opened, down into the tubes to increase the volume in tank 1.

Figure 6:
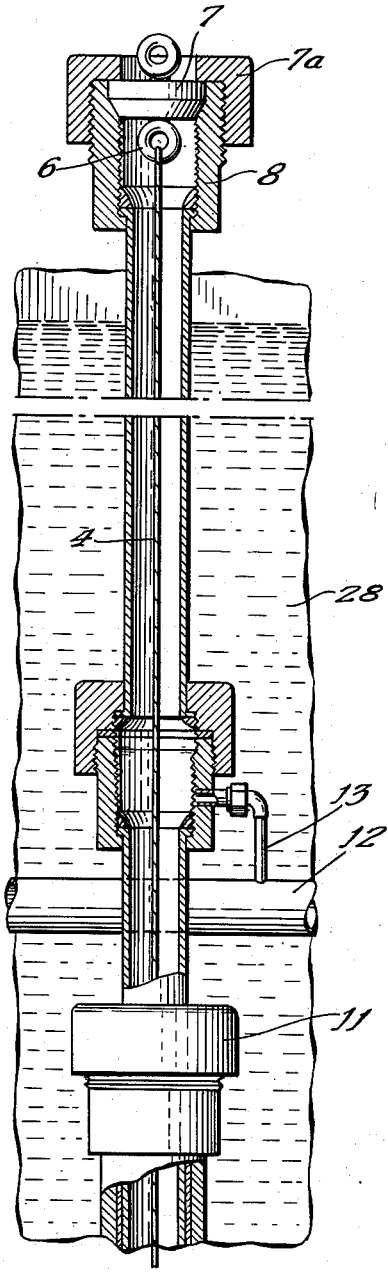
Fig. 6 is a further modification of a plug shown at the top of the structure shown in Fig. 2.

Or, if desired, the tube portions above the stuffing box may be elongated as shown in Fig. 6 and kept filled with heavy water so as to provide a hydraulic head for the pumps 14. The liquid contained in such tubes will not figure in the chain reacting system. The head may be such that even upon unscrewing the plug collars 7a to open the plugs 7, the pumps 14 do not exert sufficient pressure to raise the liquid contained in the tubes to such extent as to spill out the plug openings.

Thus there has been provided an efficient self-sustaining nuclear chain reacting system of the liquid moderator type that is cooled by the liquid moderator, said moderator being circulated and cooled as set forth, thereby making it possible to produce, with a relatively small sized system, relatively high neutron densities and relatively large amounts of the fissionable transuranic element 94$^{239}$ and the accompanying fission products.

While the theory of the nuclear chain fission mechanism in uranium set forth herein, is based on the best presently known experimental evidence, we do not wish to be bound thereby, as additional experimental data later discovered may modify the theory disclosed. Any such modification of theory, however, will in no way affect the results to be obtained in the practice of the invention herein described and claimed.

It should also be noted that the above modifications are merely exemplary and not limiting as to the scope of the invention. Other modifications will be readily suggested to those skilled in the art and that are within the scope of the invention, therefore, the invention should not be limited except insofar as set forth in the following claim.

We claim:

A self-sustaining chain reacting system comprising, in combination, a tank substantially filled with a neutron slowing liquid, a plurality of tubes supported by and extending through the top of said tank, a portion of said tubes being immersed within the neutron slowing fluid, a plurality of rods containing material fissionable by neutrons of thermal energy, one rod being disposed within in each of the tubes and immersed within the neutron slowing liquid, and a circulatory cooling system including a header for introducing said liquid adjacent to the top of said tubes, means for cooling said liquid, a pump external to said tank for circulating said liquid through said cooling means and into the header and down through said tubes to the bottom of said tank, and liquid outlet means at the bottom of said tank leading to said pump.

References Cited in the file of this patent
UNITED STATES PATENTS

| 2,127,193 | Toulmin | Aug. 16, 1938 |
| 2,206,634 | Fermi et al. | July 2, 1940 |
| 2,708,656 | Fermi et al. | May 17, 1955 |

FOREIGN PATENTS

| 114,150 | Australia | May 2, 1940 |
| 861,390 | France | Oct. 28, 1940 |
| 233,011 | Switzerland | Oct. 2, 1944 |

OTHER REFERENCES

Physical Review, vol. 56, August 1, 1939, pp. 284–286.

The Science and Eng. of Nuclear Power, ed. by Clark Goodman, pub. by Addison-Wesley Press, Inc., Cambridge, Mass. (1947), p. 275.

Kelly et al.: Phy. Rev. 73, 1135–9 (1948).

Atomics, vol. 6, No. 6, pp. 4–15, November-December 1950, pub. bi-monthly by Technical Pub. Co., Chicago, Ill.

Applied Nuclear Physics, 2nd ed., by E. C. Pollard and W. I. Davidson, pub. by John Wiley & Sons, New York, 1951.